June 22, 1971          C. R. PIERRON          3,585,641
METHOD OF MANUFACTURING OVERALLS OR LIKE CLOTHES
                AND ARTICLES THUS OBTAINED
Filed Dec. 4, 1969                              4 Sheets-Sheet 1
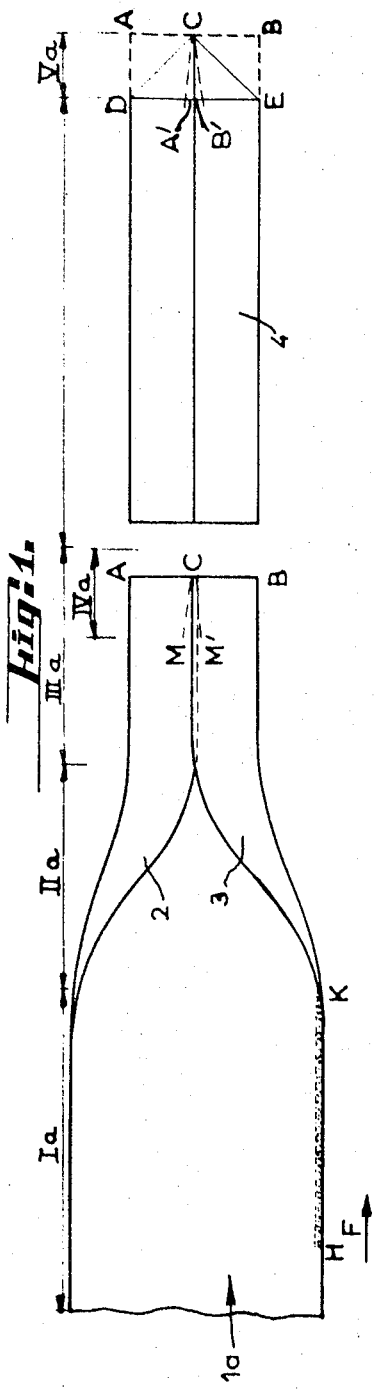
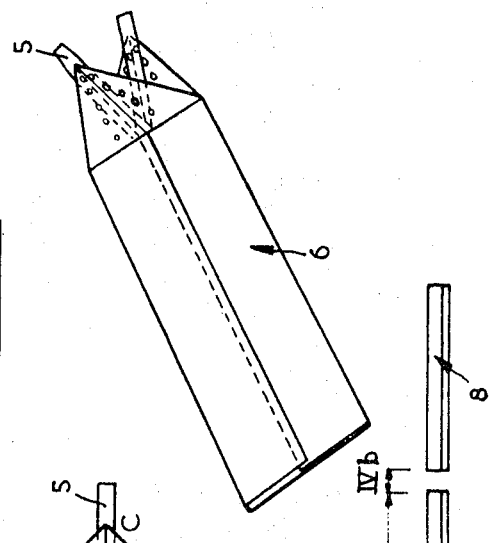
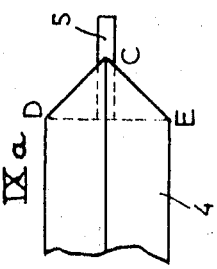
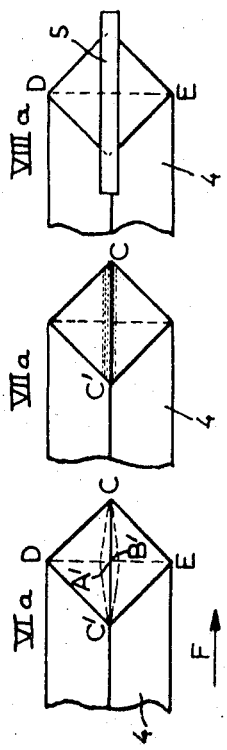
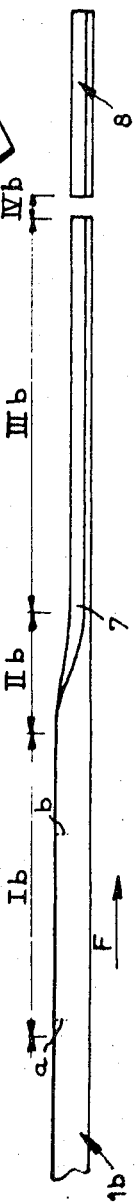
INVENTOR
CLAUDE RAYMOND PIERRON
BY
*Nolte & Nolte*
ATTORNEYS

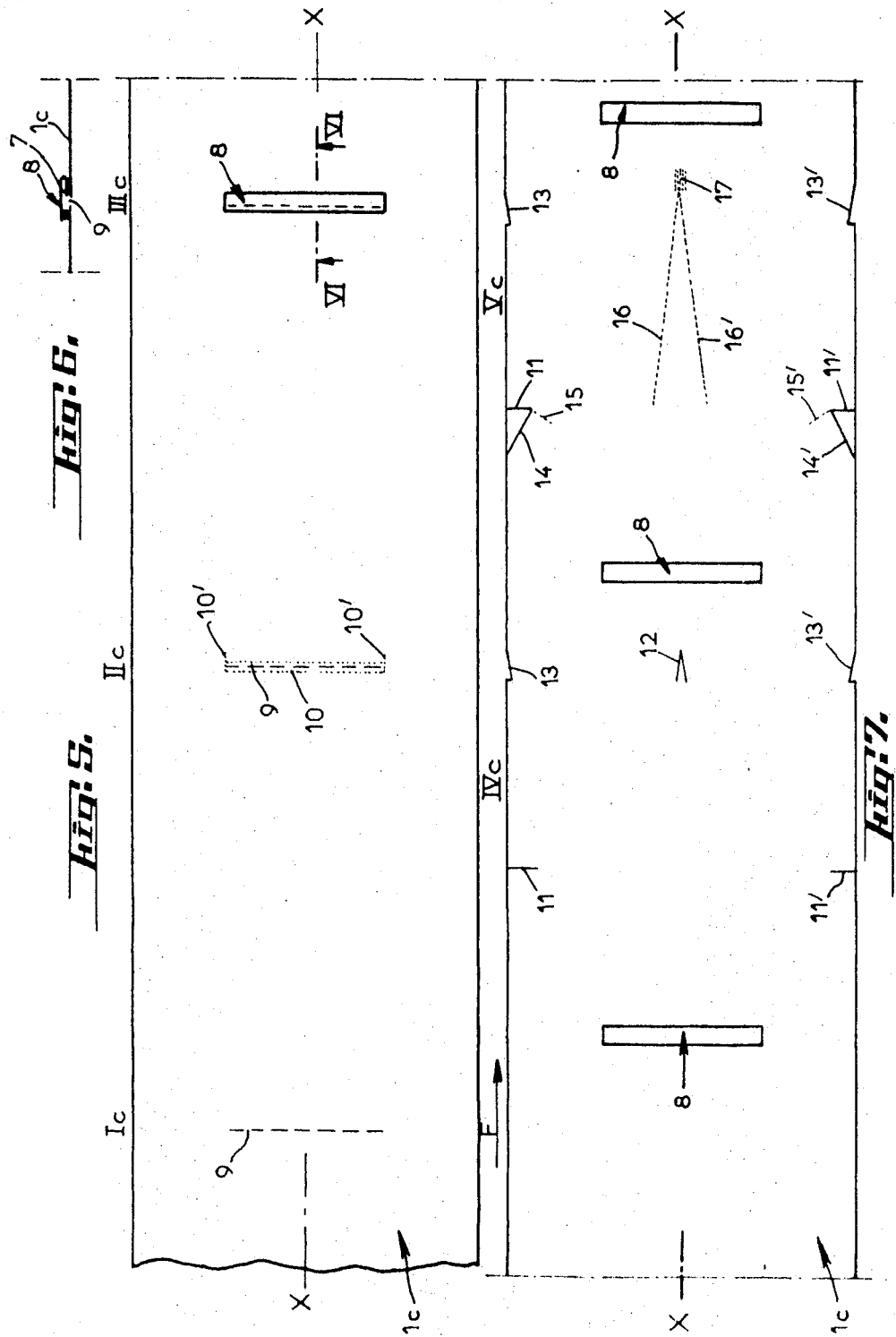

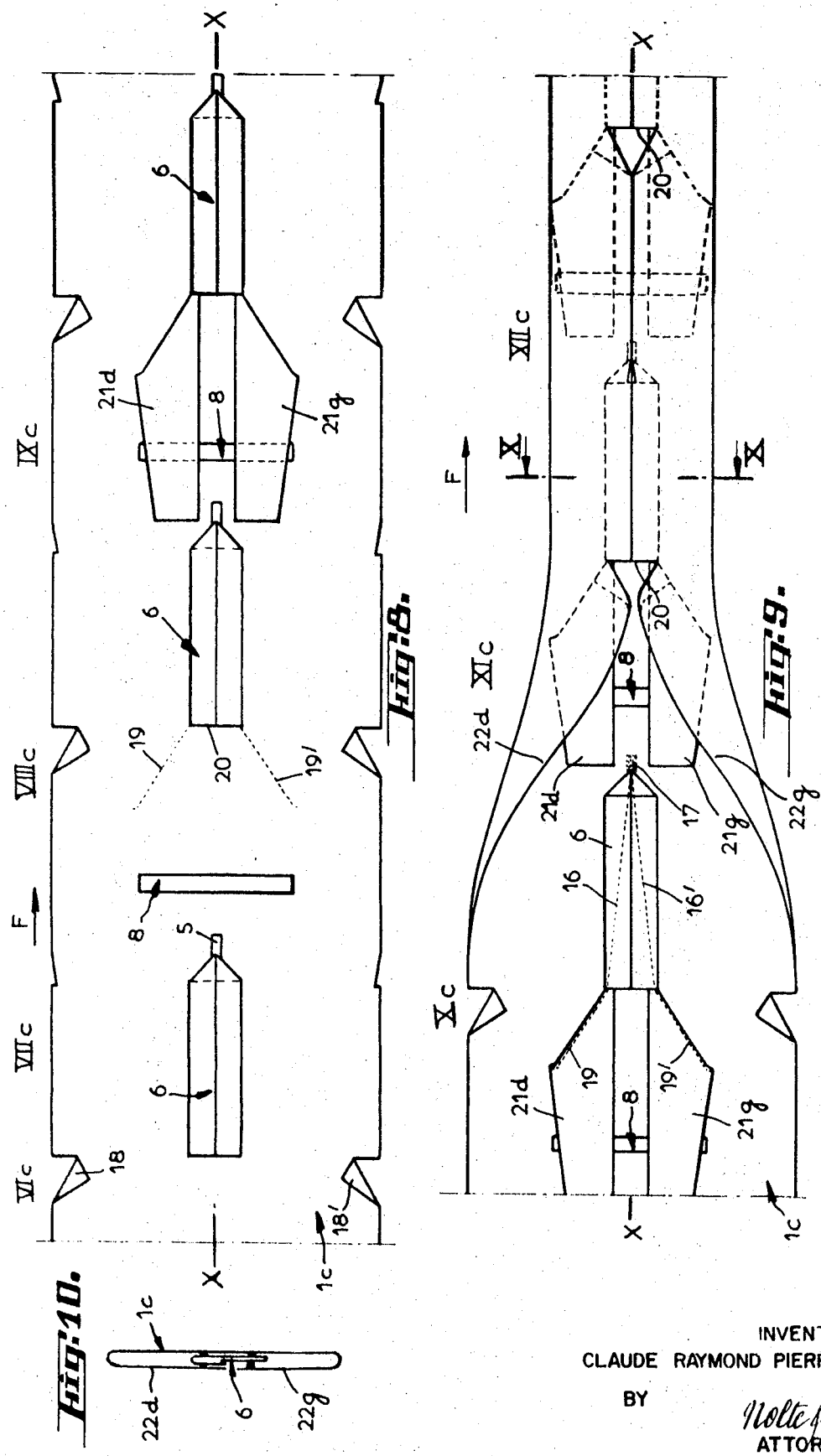

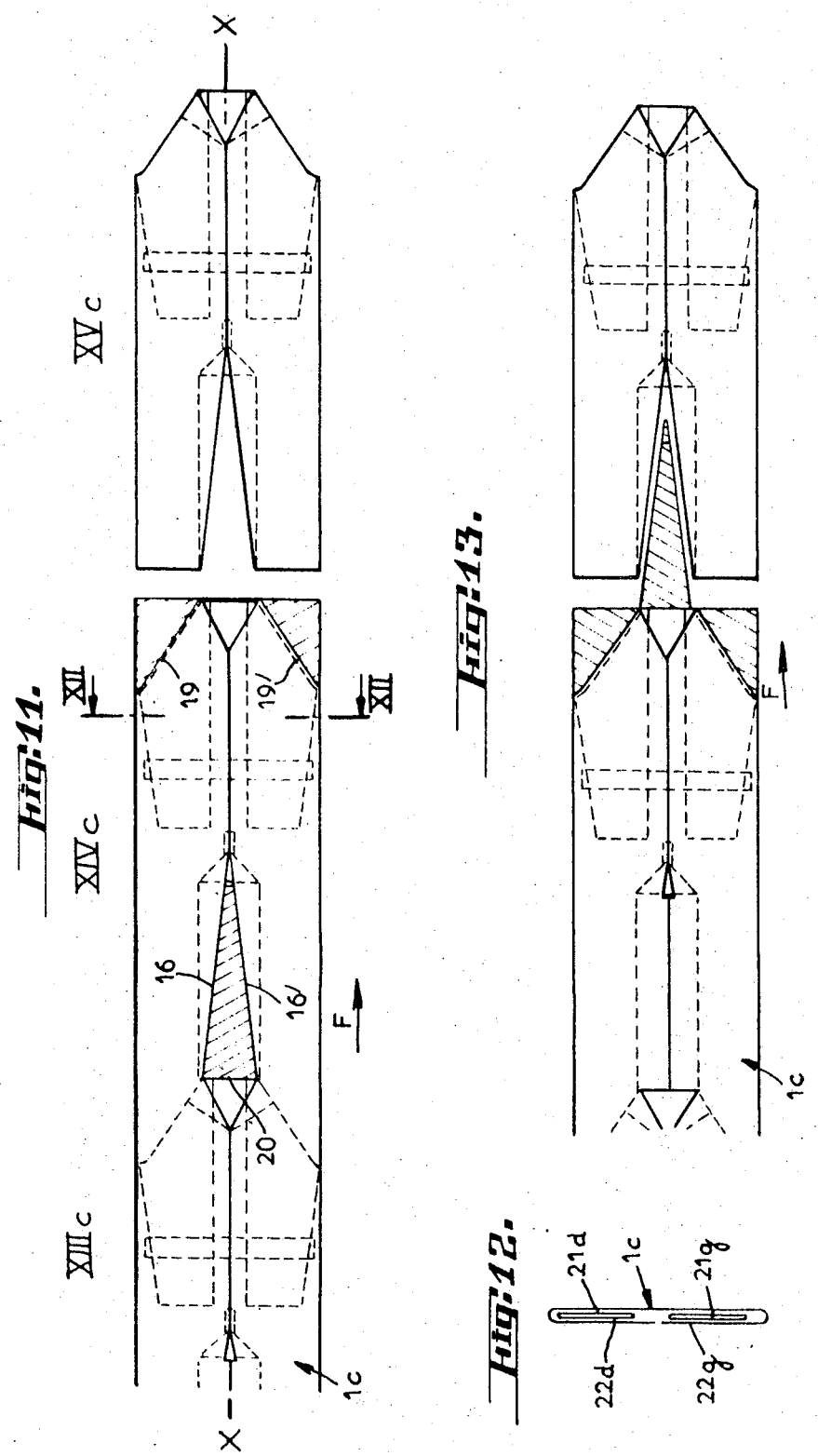

3,585,641
METHOD OF MANUFACTURING OVERALLS OR LIKE CLOTHES AND ARTICLES THUS OBTAINED
Claude Raymond Pierron, 7 Rue Albert 1er,
Epinal, Vosges, France
Filed Dec. 4, 1969, Ser. No. 882,037
Claims priority, application France, Dec. 30, 1968,
182,054
Int. Cl. A41d *13/02*
U.S. Cl. 2—79                    17 Claims

ABSTRACT OF THE DISCLOSURE

A method of making overalls, on a moving-band, flow-production basis from yielding foldable sheet material comprising prefabricating crutch easing gores and pairs of right and left sleeves, properly positioning them on a continuous web, folding back towards each other the longitudinal side portions of said web in overlapping relationship at the middle of said web to provide the body panels and legs; assembling locally said web to the sleeves along the armhole peripheries and to said gores along slant lines; and severing the individual overalls alongside said slant lines and armhole peripheries and along the leg bottoms and collar ends.

---

The present invention relates to and has essentially for its object a method of standardized industrial manufacturing, along at least one main continuous assembly line, of overalls and garments or dresses of the same kind and like articles of clothing or for protection made from any supple and foldable sheet material, comprising a sequence of preferably entirely mechanized or automated fashioning or making-up operations.

By overalls and like garments are meant generally all garments provided with both sleeves and legs of various lengths. Such overalls may consist not only of work garments, but also garments for protection for instance against dust or radiations. The material usable to this end may consist for instance of natural or artificial textiles, especially in the form of woven or knitted materials, or non woven or meshless fabrics or sheets made in particular from plain synthetic or plastic materials.

It is known that the making-up of garments, even in the case of standardized production, requires nowadays a pre-cutting and then an assembling, entailing considerable handwork during most of the manufacturing stages such as for instance mounting or basting and assembling. This necessary recourse to numerous and costly labour is the main cause of the high cost of production of the garments. As a result the industrialization of the making-up of garments comes up against several problems and difficulties, owing in particular to the fact that pure and simple application of these traditional techniques to the making-up of garments proves to be practically impossible where a continuous and completely automated making-up method is to be obtained.

These problems have however been resolved successfully, especially in the case of trouser and jacket manufacture, owing to the use of the means described in U.S. patent application Ser. No. 773,503, filed on Nov. 5, 1968, for: "Method and Machine for Manufacturing Trousers and the Like and Articles Obtained Thereby," and in U.S. patent application Ser. No. 778,984 filed on Nov. 26, 1968 for: "Method of Manufacturing Jackets and Like Garments and Jackets Obtained Thereby" now U.S. Pat. No. 3,500,479, dated Mar. 17, 1970.

The present invention therefore has for its purpose to propose a solution applicable to the manufacture of overalls and like garments, by creating a manufacturing method practically excluding any handwork or reducing it as much as possible and wherein the whole of the operations are adapted to be mechanized all along a continuous assembly line formed advantageously from several webs of material, by first performing the assembling and/or folding operations, while the separation of the various finished garments takes place preferably only during the last steps of the method, i.e. at the end of the assembly line.

With this end in view, the method according to the invention is remarkable notably in that it consists in prefabricating, independently in separate units, crutch easing gores, gussets, insets or the like, each forming the fork and the mutually confronting inner sides of the legs, as well, as pairs of respectively right-hand and left-hand sleeves and in applying them flat, through periodical recurrence, onto a web of material serving to form at least one upright panel and the back walls of the legs and having a width corresponding at least to the maximum width of the overalls. The applying is done at locations longitudinally spaced and substantially symmetrical with respect to a longitudinal, for instance at least approximately medial axis of the said web, thus forming on the latter a central row of aligned gores extending longitudinally in the same direction along the said axis and two lateral rows of respectively right hand and left-hand aligned sleeves, arranged in transverse pairs respectively between the successive gores or the like. There are superposed, longitudinally upon the said web, two elongated layers of material, each connected laterally to the said web along a longitudinal line extending at least near one edge thereof and meeting transversally in free juxtaposition substantially at the middle of the said web along a longitudinal line coinciding with the said axis, so as to each cover a different row of sleeves and a different half of gores or the like, in order to constitute respectively the two front sides of the upper portion of the overalls and the front, outer lateral and back sides of the legs. There follows securement, locally and symmetrically of the said web and the said layers to the sleeves, along the periphery of the arm-hole lines and to each corresponding face of the said gores or the like, respectively along two oblique lines defining the crutch, concurring to the said axis and converging on the sleeves so as to constitute a series of overall lengths having their own longitudinal direction corresponding to that of the web. Finally there follows separation of the individual overalls by cutting the whole assembly along lines extending alongside the said oblique lines of the gore or the like and the said armhole or breath lines as well as transversely along the leg bottoms and the collar ends, each finished overall presenting itself, at the exit of the assembly line, in a flat state with the sleeves turned inside.

According to another characteristic feature of the invention, the displacement of the aforesaid assembly line in front of the work or fashioning stations is continuous. However, it can be intermittent with periodical stops at some of the work or fashioning stations.

According to still another characteristic feature of the invention, the aforesaid two layers can be constituted by two additional distinct webs assembled respectively along their outer longitudinal edge to the opposed edges of the aforesaid initial web.

According to still another characteristic feature of the invention, and according to a variant, the aforesaid initial web has a width at least equal to the maximum transverse perimeter of the overalls and the aforesaid two juxtaposed layers are constituted respectively by two opposed longitudinal lateral portions of the said web, folded one towards the other on one and the same side of the latter along two longitudinal folding lines substantially equidistant from the aforesaid medial axis, the aforesaid sleeves being placed on the central portion of the said web and assembled respectively thereto and to the two lateral flaps turned over along their corresponding arm hole semi-perimeters.

According to still another characteristic feature of the invention, at least some of the assembling and fixing operations can be effected either by hot or cold adherent sticking after a previous gluing of the zones to be joined, or by hot or cold welding, or by sewing, stitching or overcasting, or by clamping or clipping, bordering or edging, rivetting or the like.

According to still another characteristic feature of the invention, the separation of the portions to be discarded or trimmings or excess material to be eliminated, is effected either by cutting up or by pulling or tearing off portions or pieces previously at least partially gapped, incised or perforated along lines of diminished resistance forming incipient rupture lines.

Thus, this method offers the advantage of allowing rational and economical standardized manufacture, notably on high-efficiency machines, of overalls with a great variety or diversity of appearances and conformations. Such a manufacture is rendered possible owing to some essential modifications in the very structure of the garments, so as to adapt the manufacture to the purpose sought for.

The invention is also directed to a method of standardized industrial manufacture along a substantially continuous assembly line, of the aforesaid crutch gores or the like, as well as a method of standardized industrial manufacture along a substantially continuous assembly line, of the aforesaid upright-panel easing gores or the like.

Lastly, the invention is also directed to the various application and uses resulting from the working of the aforesaid industrial methods and/or industrial products.

The invention will be better understood and other objects, characteristics, details and advantages thereof will appear as the following explanatory description proceeds, with reference to the appended diagrammatic drawings given solely by way of example illustrating one form of embodiment of the invention and wherein:

FIGS. 1 and 2 are respectively two complementary plan views to be considered one after the other and showing the successive operating phases of one form of embodiment of the method of standardized manufacture of crutch easing gores used in the method of standardized manufacture of overalls according to the invention;

FIG. 3 is a separate perspective view of a crutch easing gore in the finished state;

FIG. 4 shows the various operating phases of one form of embodiment of the method of standardized manufacture of upright panel easing gores used in the method of standardized manufacture of overalls according to the invention;

FIGS. 5, 7, 8, 9 and 11 are complementary views to be considered respectively one after the other and showing the various operating phases of one form of embodiment of the method of standardized manufacture of overalls according to the invention;

FIG. 6 is a sectional fragmentary view taken along the line VI—VI of FIG. 5;

FIG. 10 is a cross-sectional view taken along the line X—X of FIG. 9;

FIG. 12 is a cross-sectional view taken along the line XII—XII of FIG. 11;

FIG. 13 is a view similar to FIG. 11, showing the portions of material to be eliminated between two successive overalls at the end of the assembly line.

In the selected non-limitative example of embodiment, the overalls are made from a main web serving to form the bodies of the overalls and from two auxiliary webs for the making-up of the crutch easing gores and the upright panel easing gores, the said three webs being used respectively in three separate assembly lines, essentially by folding and assembling. The assembling technique, described here for illustration is sticking, which is advantageous on account of the fact that its carrying out is easy, quick, reliable and economical.

In the various figures, the glued portions or zones, i.e. the portions or zones covered with a layer, ribbon or string of glue, adhesive, or like binder, are shown by fine dotted lines; the cuts are shown by normal, plane or continuous outlines; the pre-cuts constituted by gaps such as perforations or like partial solutions of continuity, are shown by discontinuous outlines, while the folding marks or traces are shown by finer dashes.

Each method according to the invention, such as is shown in the drawings, will be carried out at fixed stations, i.e. along a motionless assembly line, but it will preferably be applied to a moving assembly line, obtained for instance through substantially continuous displacement of webs of material in the direction of the arrows F through or in front of a series of work stations where the various making-up operations are successively performed. In order to facilitate and simplify the description, each manufacturing cycle has been arbitrarily subdivided into a certain number of operating phases accomplished respectively for instance at corresponding fixed work stations through which the assembly line successively passes. For the sake of clarity of the figures, some manufacturing details have been shown only in the operating phase or at the work station where they are mentioned for the first time.

There will first be described the method of standardized manufacture of crutch easing gores with reference to the complementary FIGS. 1 and 2. The crutch gores are formed succesively from a web of material $1a$ of middle width, constituting the support of the corresponding assembly line and passing successively through the web stations numbered respectively from $Ia$ to $IXa$.

At station $Ia$, there is performed a gluing of one of the longitudinal or lateral edges of the web $1a$, either along the whole length of the web or possibly over a length HK approximately equal to half the length of the gore to be made.

At station $IIa$, the two lateral edges of the web $1a$ are folded longitudinally onto one and the same face, for instance the upper face, of the web according to two layers or flaps 2, 3 which are brought together or meet one another by being for instance turned over into one another so as to overlap over a small width by their adjacent free longitudinal edges.

At station $IIIa$ the said folded lateral edges are stuck on one another over their partial overlap width, by the aforesaid glued zone, so as to constitute a flattened tubular web. Instead of forming such a flattened tubular web through longitudinal, preferably bilateral, folding and overlap assembling of the edges of a simple initial web, it may also be constituted from the very beginning by a tubular sheath. On the other hand, the aforesaid bilateral folding may be replaced by a unilateral folding of the web into two equal halves, so as to turn over one of the edges of the web onto the other endge to coincide with the latter, so that the assembling line then extends along one edge of the flattened tubular web thus formed instead of being located substantially along the medial longitudinal axis thereof.

At station $IVa$, the two substantially plane, respectively lower and upper, walls of the tubular web are advantageously gapped, for instance, perforated along two preferably substantially straight lines CM, CM' substantially symmetrical with respect to the longitudinal assembling line of the flaps or layers 2, 3 and forming an acute angle $\widehat{MCM'}$ substantially equal to the opening of the crutch and the vertex C of which is located on the downstream end of the aforesaid longitudinal assembly lines, these lines having preferably a length slightly superior to half the width of the crutch. The perforations serve to facilitate the separation of the material by tearing or pulling off during the cutting of the respectively upper and lower walls of the crutch easing gore as will be explained hereinafter. At this work station, the web is also cut up transversely along a line AB passing through the end C of the aforesaid assembling line, so as to thus separate a section or segment 4 forming a separate tubular element whose length is at least equal to that of the crutch.

At station V$a$, after a marking, possibly by means of a mechanical tracing, of the folding lines, the downstream-end corners A and B of the tubular element 4 are turned in symmetrically with respect to the longitudinal medial axis, so as to obtain by this folding two superposed terminal tabs, jointly substantially in the shape of a right-angled isosceles triangle CDE the right-angle vertex of which is located at C. The tabs, adjacent hypotenuse DE, have vertices A and B moved respectively to A' and B', while the vertices D and E are located respectively on the folded longitudinal edges of the tubular element 4. These two triangular tabs are substantially symmetrical with respect to a plane parallel to the plane of the figure.

At station VI$a$ the aforesaid triangular terminal tabs are parted by turning over one of them flat, i.e. through 180° outwardly, therefore to the left in FIG. 2, against the upper wall of the tubular element 4, about the transverse folding line DE forming a hinge line, while the other tab remains in its own plane. The corner C is thus divided into two to form the points C and C', quadrangle DCEC' forming substantially a square with perpendicular diagonals DE and CC' forming a junction or abutment line for the joined longitudinal edges CA'C' and CB'C' of, respectively, the folded portions of material forming the triangles DCC' and CEC'.

At station VII$a$, there is performed a gluing of the line CC' over a zone overstepping this line transversely on both sides.

At station VIII$a$ a closing tongue 5 constituted for instance by a portion of ribbon, narrow band or the like, is stuck on the line CC' along a zone previously made adhesive and this tongue 5 has a length substantially greater than the segment CC' so as to extend equally beyond each end of this segment. This tongue therefore joins together the previously mentioned joined edges CA'C' and CB'C.

At station IX$a$ the triangular tab DC'E is turned over to the right onto the triangule tab DCE about the transverse folding line DE and a crutch easing gore in the finish state is thus obtained as shown in perspective in FIG. 3 and denoted generally by reference number 6.

There will now be described the method of standardized manufacture of upright panel easing gores, for instance the back gores of the overalls, with reference to FIG. 4. These easing gores are formed from a relatively narrow, indefinite web of material 1$b$ passing successively through work stations numbered respectively from I$b$ to IV$b$.

At station I$b$ the web 1$b$ is glued each time along two transverse lines $a$ and $b$ respectively perpendicular to one and the same longitudinal edge of the web and extending from the latter over one and the same length inferior to the width of the web 1$b$. The longitudinal spacing between these two transverse gluing lines corresponding substantially to the desired length of the easing gore to be obtained.

At station II$b$ the longitudinal edge carrying the glued zones $a$ and $b$ is turned over onto the web along a longitudinal folding line, the folded-over portion 7 having a width corresponding to the length of the glued lines $a$, $b$, so that it partially covers the remaining portion of the web.

At station III$b$ the folded-over portion 7 is assembled locally to the remaining portion of the web along the transverse gluing lines $a$ and $b$.

At station IV$b$ the folded web is cut up transversely along two lines extending externally alongside the respective glued zones $a$ and $b$ so as to thus separate a section 8 constituting the finished easing gore.

The manner of manufacturing the respectively right-hand and left-hand sleeves of the overalls to be obtained will not be described here, as it may advantageously be selected from those fully described and illustrated in U.S. patent application Ser. No. 778,984, filed on Nov. 26, 1968; for: "Method of Manufacturing Jackets and Like Garments and Jackets Obtained Thereby."

There will now be described the method of standardized manufacture of the overalls with reference to the successively complementary FIGS. 5, 7, 8, 9 and 11 of the drawings. The overalls are manufactured from a web of material 1$c$ of great width corresponding substantially to the maximum transverse perimeter of the overalls. This web forming the support of the continuous assembly line passes through the work stations numbered respectively from I$c$ to XV$c$, the crutch gores, the upright panel easing gores and the sleeves, prefabricated separately, being laid in the finished or semi-finished state onto the said web at some of these work stations. The dot-and-dash line XX denotes the longitudinal medial axis, or axis of symmetry, of the web 1$c$.

At station I$c$ there is effected an incision or preferably a gapping, for instance by perforation of the central portion of the web 1$c$ along a transverse segment 9 substantially perpendicular to the axis XX and symmetrical with respect to the latter. This segment has a length slightly inferior to the length of the easing gore 8 of the upright panel.

At station II$c$ the web 1$c$ is glued over a rectangular zone 10 symmetrically surrounding the segment 9 by extending transversely. The small sides 10' of this glued rectangle 10 are prolonged longitudinally in the downstream direction in such a manner that their length corresponds substantially to the width of the easing gore 8. The length of this rectangular gluing zone in the transverse direction corresponds substantially to that of the easing gore 8 and its width is substantially equal to the spacing between the edges of the two unequal folded portions constituting the easing gore 8.

At station III$c$ a prefabricated easing gore 8 is laid and fixed, that is to say stuck onto the aforesaid glued zone 10 in such a manner that the edges of the two folded-over portions of the gore are fixed respectively on both sides of the perforated segment 9, the turned-over portion 7 of the gore being turned towards the web 1$c$, as shown more particularly in FIG. 6. The perforations provided along the segment 9 at the back of each overall, at the location of the corresponding easing gore, are liable to tear during the use of the garment under the action of a strain at the back of the garment, so that the easing gore 8 then ensures the continuity of the material at the back of the overall, the shape of the gore imparting a certain ampleness to the garment.

At station IV$c$ the opposed, longitudinal and substantially parallel edges of the web 1$c$ are incised perpendicularly along two segments 11, 11' substantially aligned and symmetrical with respect to the axis XX, the length of which is equal to the desired height of the revers of the overall collar. These notches 11, 11' are located downstream of the gore 8 at a distance from the latter corresponding substantially to the distance between the said gore and the overall collar at the level of which are located the segments 11, 11'. There is also performed, upstream of the same gore 8, at a level located at a distance from the latter equal to the distance between the said gore and the crutch bottom of the overall trousers on the one hand, an acute-angled central incision 12 symmetrical with respect to the axis XX and the vertex of which is located on the said axis and points in the downstream direction or in the direction of the collar and on the other hand, at each free longitudinal edge of the web, a mating lateral cut or opening 13, 13' substantially in the shape of a right-angled triangle with a hypotenuse extending obliquely or inclined to the edge. The cuts 13, 13' are substantially symmetrical with respect to the longitudinal medial axis XX, so that a folding over of the lateral edges of the web 1c inwardly onto the axis XX brings into exact superposition or coincidence the cuts 13 and 13' with the corresponding portions of the incision 12. The notched or cut portions 12, 13, 13' have a shape corresponding respectively in spread and magnitude to the perforation lines CM, CM' made in the crutch gore 6 at station IVa.

At station Vc there is effected the mounting and the formation of the folding lines 14, 14' for the collar revers. These lines inclined or oblique with respect to the longitudinal direction of the web 1c are symmetrical with respect to the axis XX and connect the inner ends of the segments 11, 11' respectively to the longitudinal edges of the web. Their length corresponds to the desired length of the reverse of the overall collar. There is also effected a gluing along the segments 15, 15' resulting from the folding over through 180° of the segments 11, 11' about their respective folding lines 14, 14'. Lastly, there is also effected a gluing along two oblique lines 16, 16' concurring to the medial longitudinal axis XX substantially symmetrically with respect to the latter and respectively extending alongside and in prolongation of the corresponding sides of the incision 12 over a length equal to the length of the leg, the acute angle formed by these lines corresponding to the crutch spread. Further, a substantially rectangular surface 17 is glued, which extends along the medial axis XX symmetrically with respect to the latter and whose length corresponds to the length of the endmost portion of the closing tongue 5 extending beyond the crutch gore 6.

At station VIc the reverse 18, 18' defined with the respective longitudinal edges of the web by the lines 14, 11 and 14', 11' are folded over onto the web 1c through folding along the segments 14, 14' and stuck along the glued segments 15, 15'.

At station VIIc the crutch easing gore is laid on the web 1c in such a manner that the perforated lines CM, CM' of the said gore substantially coincide with the glued lines 16, 16' of the web and the gore is fixed by sticking its lower face to the glued lines 16, 16' and by the lower endmost portion of its tongue 5 which is applied on the glued zone 17, the gore thus being positioned substantially symmetrically with respect to the medial longitudinal axis XX upstream of the upright panel easing gore 8.

At the next stations VIIIc the web 1c is glued in its central portion along two oblique lines 19, 19' starting respectively for instance from the upstream or left-hand endmost corners or vertices of the preceding downstream crutch gore 6, by diverging in the upstream direction and substantially symmetrical with respect to the medial longitudinal axis XX. These glued lines 19, 19' occupy substantially the location of the arm-hole lines and their length corresponds substantially to the arm-hole semi-perimeter. These lines are substantially rectilinear in the present case and end directly at the neck line 20. It is obvious that they may also be broken or curved, convex lines so as to provide a shoulder breadth line.

At station IXc a pair of prefabricated, respectively right-hand 21d and left-hand 21g, sleeves is brought in the semi-finished or finished state onto the web 1c and arranged flat in such a manner, symmetrically with respect to the axis XX, that the lower wall of each sleeve is stuck on the central portion of the web by the edge of its arm-hole end defining an arm-hole semi-perimeter and applied on the glued line 19, 19'. In the example illustrated the bottom of each crutch gore 6 is thus adjacent along a common transverse line 20 to the collar of the following adjacent overall in the sense of feed or progression of the assembly line. This is by no means indispensable, but it is advantageous in that it allows to save material.

At station Xc the upper face or wall of the crutch gore 6 is glued along the lines 16, 16' and over the zone 17 corresponding respectively to the gluing lines and zone obtained at station Vc. There is also performed a gluing of the upper faces or walls of the sleeves along lines 19, 19' extending internally alongside the arm-hole lines and homologous to those made at station VIIIc.

At station XIc the web 1c is folded bilaterally through longitudinal folding of the lateral portions or layers 22d, 22g, in such a manner that its lateral edges meet one another and merge with the medial longitudinal axis XX. The cuts 13, 13' made at station IVc are thereby juxtaposed symmetrically on the medial longitudinal axis XX, thus forming an identical cut superposed on the incision 12. The folded over lateral flaps 22d, 22g of the web are fixed by sticking on the upper walls of the sleeves along the glued arm-hole lines 19, 19' and on the crutch gore along the oblique glued lines 16, 16' defining the angular spread of the crutch. The legs of the overall are thus formed by the association of the web 1c with the crutch gore 6. Thus, for instance, the right leg is formed by the turned-over lateral flap 22d which forms the front portion of the leg and is assembled along the line 16 to the upper wall of the gore 6 which constitutes the inner wall of the leg. The back wall of the leg is constituted by the corresponding central portion of the web 1c assembled along the line 16 to the lower portion of the crutch gore 6.

At station XIIc glued portions are provided for the fixing of possible accessory parts, such as internal and external jacket or trouser pockets, sleeve straps, shoulder straps, reinforcing pieces, edgings, various closing systems for the collar, the wrists, the jacket front sides or the like, which are prepared, laid and fixed during the course of manufacture, especially during the intermediate or final steps of the method of the invention.

FIG. 10 is a cross-sectional view of the web as a whole constituting the assembly line, after the carrying out of phase XIc of the manufacturing method, showing notably the relative position and the assembling of the crutch gore 6 through the central portion of the web 1c and to the folded over lateral flaps 22d, 22g of the latter.

At station XIIIc there is effected the fixing of the aforesaid accessory parts to the assembly line.

At station XIVc the portions of material to be eliminated are cut across the whole thickness of the assembly line, along the line extending alongside the assembling lines 16, 16' of the crutch gore 6 and extending in prolongation of the perforation lines CM, CM' made in the said gore at station IVa and along a transverse line 20 extending alongside the back portion of the collar and constituting also the leg bottoms, so that the zone thus recessed has substantially the triangular shape hatched on the drawing (FIG. 11). The said cutting may be carried out simply by tearing or pulling off along the perforation lines thus enabling to separate or eliminate the material comprised in the aforesaid triangle. Cuttings are also effected along the lines extending externally alongside the lines 19, 19' where the sleeves are assembled to the web 1c, in order to separate and eliminate the corresponding hatched triangular portions.

At station XVc the overall, which has been separated from the assembly line in particular by transverse cutting up of the web 1c along the line 20 appears in its finished state, folded flat and right side out, the sleeves being turned inwardly.

FIG. 12 is a cross-sectional view of the web approximately at the level of the middle of the sleeves, showing the relative arrangement of the latter inside the web 1c folded up around the sleeves.

In FIG. 13 the excess material to be eliminated between two successive overalls of the assembly line at the end of the latter are shown by hatched zones for guidance.

It is to be noted that the dividing of each manufacturing method into working steps is shown purely by way of illustration, since some of these operating steps may be inverted or combined, or omitted, or additional steps may be provided for, or again generally speaking, the sequence of the manufacturing operations may be varied. For instance work stations may be provided to carry out the assembling of inside accessory parts such as edged or hemmed pockets for the trousers or inside pockets for the jacket, these stations being placed before the station performing the bilateral folding of the web.

Likewise, the sequence of the work stations effecting the gluing and fixing of the upright panel easing gore may be interchanged with the sequence of the work stations performing the gluing and the fixing of the crutch gore. The fixing of the upright panel easing gore must of course be performed before the laying of the sleeves.

Also, the sequence of the steps performing the fixing of the crutch gore may be interchanged with the sequence of the steps effecting the fixing of the sleeves, provided that all these operating steps are carried out before the operation of bilateral folding of the web.

In other respects, the stations carrying out the cuttings corresponding to the crutch easing gore and those carrying out the cutting, folding and fixing of the reverse, may be placed at any stage before the web folding operation.

At the end of the assembly line there may be provided one or several additional stations for effecting the folding and possibly the packing or the conditioning of the finished overalls. In addition, there may be provided at the beginning, at the middle or at the end of the assembly line printing stations for the main web or the finished overalls, adapted to print some kind of mark characterizing for instance the customers for whom the overalls are intended.

Lastly, there may possibly be provided at the end of the assembly line a cutting or transverse cutting station for separating each finished overall into two portions, for instance at the level of the belt or of the waist so as to obtain separately a jacket and trousers.

It is to be noted that the crutch easing gore according to the invention enables to make trousers in an original and advantageous manner on account of the comfort offered by a garment according to the invention.

Although the assembling and fixing operations in each method according to the invention described by way of example have been described as being carried out by sticking, any other equivalent assembling or fixing means may be used and may be selected for instance from those mentioned hereinabove.

Of course, the invention is by no means limited to the forms of embodiment described and represented which have been given by way of example only. In particular, it comprises all the means constituting technical equivalents to the means described, as well as their combinations if the latter are carried out according to the spirit of the invention.

What is claimed is:

1. A method of standardized industrial manufacture on a moving-band flow-production basis along at least one continuous main assembly line, of overalls, boilersuits and similar one-piece garments of the same kind and like articles of clothing and protection made from a flexible foldable sheet material, including a sequence of entirely mechanized and automatic fashioning and making-up operations and comprising the steps of: prefabricating independently, in separate units, crutch easing gores and like gusset and inset components, the crutch easing gore comprising the crutch and the opposed inner sides of the legs, said inset components including a pair of right and left sleeves; sequentially positioning said sleeves in a flattened condition at predetermined spaced locations on a continuous web of said material adapted to form at least one upright body panel and the back walls of the legs and having a width corresponding to a least the maximum width of the overalls, at locations longitudinally spaced and substantially symmetrical with respect to substantially the central longitudinal axis of said web, thereby providing on the latter a central row of aligned crutch easing gores extending longitudinally in the same direction along said axis and two lateral rows of aligned, respectively right and left sleeves arranged by transverse pairs respectively between the successive crutch easing gores; superposing longitudinally on said web two continuous layers of said material, each one of said layers being connected to said web along a longitudinal line adjacent opposite outer edges thereof and meeting together transversely in free juxtaposition substantially at the middle of said web along a longitudinal line registering with said axis, each layer covering a different row of sleeves and a different half of the crutch easing gores, so as to provide respectively the two front sides of the body portion of the overalls and the front, outer lateral and back sides of the legs; locally and symmetrically securing said web and layers to the sleeves along the periphery of the upper arm-hole lines and to each corresponding face of said crutch easing gores respectively along two slant lines which intersect at said axis to define the crutch, said slant lines converging towards the sleeves, so as to form a series of overall blanks having their own longitudinal direction corresponding to that of said web; and severing the individual overalls by cutting the whole assembly along lines extending alongside said slant gore lines and said armhole lines, as well as transversely along the leg bottoms and the collar ends, each finished overalls presenting itself at the egress of the assembly line in a flat-laid condition with the sleeves turned inside.

2. A method according to claim 1, wherein said two layers partially overlap by their adjacent free longitudinal edges.

3. A method according to claim 1, wherein said layers consist of separate webs.

4. A method according to claim 1, wherein said initial web has a width at least equal to the maximum perimeter of the overalls and said two juxtaposed layers are constituted respectively by two opposite longitudinal lateral portions of said web folded back as flaps towards each other on a same side of the latter along two longitudinal folding lines substantially equidistant from said central axis said sleeves being placed on the central portion of the web and assembled respectively to the latter and to the two turned-over lateral flaps by their corresponding armhole semi-perimeters.

5. A method according to claim 1, wherein at least some of said assembling and affixing steps are carried out by adherent sticking after a previous gluing of the zones to be joined.

6. A method according to claim 1, wherein at least some of said assembling and affixing steps are carried out by a welding and like sealing process.

7. A method according to claim 1, wherein the separation of the portions to be spread apart and the severing of the trimmings and excess mtaerial to be eliminated is performed by tearing off portions and pieces previously at least partially scored by perforating to provide weakened incipient rupture lines.

8. A method according to claim 1, wherein said moving-band of said assembly line moves past a plurality of working stations.

9. A method according to claim 1, wherein the bottom of each crutch easing gore is adjacent along a common transverse line to the collar of a next following overall in the direction of feed of said assembly line.

10. A method according to claim 1, wherein lapels are cut, marked, folded and affixed in the longitudinal edges of said lateral flaps before superposing through symmetrical cutting along a line perpendicular to the edge at the level of each collar and having a length equal to the desired lapel height, and through folding back of a triangular tab inwards about an oblique folding line.

11. A method according to claim 1, wherein easing gores for the body back panels are prefabricated separately and are secured respectively along the periphery of central transverse score lines in substantially symmetrical relation to said central axis and located respectively between the successive positions of said crutch easing gores.

12. A method according to claim 1, wherein said longitudinal web at the level of the location of the bottom of each crutch is provided with an acute-angled central score with the vertex thereof lying on said central axis and pointing towards the associated collar, and each free longitudinal edge is provided with a mating lateral cut in the shape of a right-angled triangle which, after folding back, coincides with one half of said central score.

13. A method according to claim 1, wherein said crutch easing gores are prefabricated in mass production from a flattened tubular continuous web, by effecting successively transverse cutting of said web to separate sections forming tubular elements of a length at least equal to that of the crutch, and symmetrical turning inwards of the endmost downstream corners of each section, so as to form through folding at the downstream end two overlying end tabs in the shape of isosceles right-angled triangles mutually adjacent by their hypotenuses along a transverse folding line, and assembling, to said tabs, of a common strip extending along the height of the right-angled triangles and also beyond the tips of the right-angled/vertices and joining to one another the edges of the tubular element brought together by folding.

14. A method according to claim 13, wherein easing gores for the body panels, in particular the back panels, are prefabricated from an indefinite length narrow band through longitudinal folding into two portions of unequal widths, securing the latter along successive transverse lines spaced from one another by a distance equal to the lengths of the gores and extending along the width of the narrowest folded back portion, and severing the finished gores through transverse cutting-off along lines extending respectively along the transverse, securing lines.

15. A method according to claim 14, comprising the following steps carried out successively: scoring of said initial web along spaced transverse parallel central lines; laying down, positioning and assembling on said web of an aforesaid body panel easing gore to the periphery of each score line which is slightly shorter than the corresponding gore; laying down, positioning and assembling on said web of an aforesaid crutch easing gore by its engaging face along the corresponding projecting end of said strip and along the two slant lines starting from the tip of the gore; and bilateral folding of said web and securing said web to the flaps to each crutch easing gore on the corresponding face thereof along the corresponding projecting end of said strip and along two slant lines homologous to those of the other face.

16. A method according to claim 15, wherein each aforesaid transverse core line is replaced by a frangible perforation.

17. A method according to claim 13, wherein each aforesaid tubular element, adapted to provide an aforesaid crutch easing gore is formed through bilateral longitudinal folding of its generating web and overlapped assembling of the edges thus folded back along a substantially medial longitudinal line and further comprising the step of perforating symmetrically with respect to the latter, in the two superposed walls/thus provided, two lines forming between themselves an acute angle the opening of which corresponds to that of the crutch and the vertex of which is located on the downstream end of said element, said lines having lengths slightly exceeding half the width of said crutch easing gore.

References Cited
UNITED STATES PATENTS

| | | | |
|---|---|---|---|
| 3,015,106 | 1/1962 | Van Moer | 2—79 |
| 3,435,461 | 4/1969 | Artzt | 2—243X |

H. HAMPTON HUNTER, Primary Examiner

U.S. Cl. X.R.

2—143R